US012781807B2

(12) United States Patent
Uehara

(10) Patent No.: US 12,781,807 B2
(45) Date of Patent: Nov. 3, 2026

(54) POWER TRANSMISSION DEVICE

(71) Applicant: EXEDY Corporation, Neyagawa (JP)

(72) Inventor: Hiroshi Uehara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 19/347,844

(22) Filed: Oct. 2, 2025

(65) Prior Publication Data

US 2026/0126083 A1 May 7, 2026

(30) Foreign Application Priority Data

Nov. 1, 2024 (JP) ................................. 2024-192743

(51) Int. Cl.
*F16D 7/02* (2006.01)
*F16D 3/12* (2006.01)
*F16D 3/66* (2006.01)

(52) U.S. Cl.
CPC ............... *F16D 7/025* (2013.01); *F16D 3/12* (2013.01); *F16D 3/66* (2013.01)

(58) Field of Classification Search
CPC ... F16D 3/12; F16D 3/66; F16D 7/025; F16D 7/027; F16F 15/13453; F16F 15/13469
USPC ........................................... 464/45, 46, 68.4
See application file for complete search history.

(56) References Cited

U.S. PATENT DOCUMENTS 10,948,024 B1 * 3/2021 Uehara ............... F16F 15/1297
11,408,468 B2 * 8/2022 Uehara ..................... F16D 3/12
2002/0092715 A1 * 7/2002 Yabe ................... F16F 15/1397 188/130
2004/0045152 A1 * 3/2004 Uno ........................ F16D 7/025 29/469
2005/0070362 A1 * 3/2005 Mende .............. F16F 15/13453 464/68.41
2006/0180423 A1 * 8/2006 Kos ......................... F16D 13/64 192/113.36
2007/0191118 A1 * 8/2007 Saeki ...................... F16D 7/025 464/46
2008/0105512 A1 * 5/2008 Saeki .................. F16F 15/1297 192/109 R
2008/0128235 A1 * 6/2008 Avins .................. F16F 15/1297 29/428

(Continued)

FOREIGN PATENT DOCUMENTS

JP 2019-203580 A 11/2019

*Primary Examiner* — Daniel J Wiley
(74) *Attorney, Agent, or Firm* — United IP Counselors, LLC

(57) ABSTRACT

A power transmission device includes a first rotor, a second rotor, a support member, an elastic member, and a first friction plate. The second rotor is disposed to be rotatable relative to the first rotor. The support member is attached to the second rotor. The elastic member elastically couples the first rotor and the second rotor therethrough to each other. The first friction plate includes an outer slide portion and an inner slide portion. The outer slide portion is disposed radially outside the elastic member. The inner slide portion is disposed radially inside the elastic member. The inner slide portion is disposed between the second rotor and the support member in an axial direction. Each of the outer slide portion and the inner slide portion generates a friction force when the first friction plate is rotated relative to the second rotor.

20 Claims, 6 Drawing Sheets

(56) References Cited

U.S. PATENT DOCUMENTS

2010/0224459 A1* 9/2010 Saeki ...................... F16D 7/025 192/56.1
2011/0098119 A1* 4/2011 Saeki ...................... F16D 13/64 464/30
2011/0120832 A1* 5/2011 Takeshita .............. F16F 15/163 192/208
2012/0046114 A1* 2/2012 Doman ............... F16F 15/1395 464/45
2012/0142437 A1* 6/2012 Doman ................. F16D 43/215 464/46
2012/0217113 A1* 8/2012 Kawahara ........... F16F 15/1397 192/3.21
2012/0242017 A1* 9/2012 Saeki ...................... F16D 7/027 267/136
2012/0298472 A1* 11/2012 Saeki .................. F16F 15/1295 192/207
2013/0029771 A1* 1/2013 Saeki .................... F16F 15/129 464/45
2013/0035170 A1* 2/2013 Uehara ............ F16F 15/13469 464/68.1
2013/0231195 A1* 9/2013 Takenaka ............ F16F 15/1205 464/66.1
2013/0244799 A1* 9/2013 Sugiyama ................. F16D 7/00 464/68.8
2013/0244800 A1* 9/2013 Sakai .................. F16F 15/1485 464/68.41
2013/0310184 A1* 11/2013 Takenaka .............. F16F 15/129 464/68.4
2014/0094321 A1* 4/2014 Miyagawa .......... F16F 15/1297 464/46
2014/0323232 A1* 10/2014 Nakagaito ................. F16D 3/12 464/68.1
2015/0045124 A1* 2/2015 Steinberger ............. F16D 7/025 464/46
2015/0133225 A1* 5/2015 Watarai ..................... F16D 3/12 464/68.6
2015/0267756 A1* 9/2015 Yamazumi ................ F16D 3/66 464/68.8
2015/0377319 A1* 12/2015 Usui ..................... F16F 15/139 464/46
2016/0040723 A1* 2/2016 Nakagaito ................. F16D 3/12 464/68.1
2016/0047434 A1* 2/2016 Sugiyama .............. B60K 6/365 464/68.1
2016/0069458 A1* 3/2016 Patiño Crespo ...... F16F 15/134 29/428
2016/0160931 A1* 6/2016 Ocomatl Quiroz ..... F16H 45/02 60/338
2016/0201729 A1* 7/2016 Uehara ............. F16F 15/12326 464/68.92
2016/0208862 A1* 7/2016 Kubota ............. F16F 15/12333
2016/0208863 A1* 7/2016 Fujii ................. F16F 15/12326
2016/0223026 A1* 8/2016 Uehara ..................... F16D 3/12
2017/0002870 A1* 1/2017 Kubota ............. F16F 15/12386
2017/0023070 A1* 1/2017 Lebas ............... F16F 15/13492
2017/0045113 A1* 2/2017 Ito ............................ F16D 3/12
2017/0108050 A1* 4/2017 Lee ........................... F16D 3/12
2017/0146071 A1* 5/2017 Adari ........................ F16D 3/12
2017/0152914 A1* 6/2017 Takikawa .......... F16F 15/12366
2017/0276223 A1* 9/2017 Kawahara ........... F16F 15/1421
2018/0216696 A1* 8/2018 Marechal .............. F16F 15/145
2018/0259001 A1* 9/2018 Wakabayashi ........ F16F 15/134
2019/0072154 A1* 3/2019 Kawahara ............. F16F 15/145
2019/0145491 A1* 5/2019 Tomita ...................... F16D 3/12 464/7
2019/0264774 A1* 8/2019 Kawahara ........... F16F 15/1297
2019/0346030 A1* 11/2019 Aikawa ................. F16F 15/123
2020/0096050 A1* 3/2020 Uehara ..................... F16D 3/12
2020/0173521 A1* 6/2020 Tachiuchi ........... F16F 15/1297
2020/0292008 A1* 9/2020 Tomita ................ F16F 15/1297
2020/0318691 A1* 10/2020 Uehara ................. F16F 15/123
2020/0386274 A1* 12/2020 Usui ................... F16F 15/1232
2021/0018046 A1* 1/2021 Häßler ................ F16F 15/1204
2021/0062869 A1* 3/2021 Mingas ................... F16D 7/025
2021/0062870 A1* 3/2021 Mingas ................... F16D 7/027
2021/0102584 A1* 4/2021 Uehara ................... F16F 15/30
2021/0102598 A1* 4/2021 Uehara ............. F16F 15/13415
2021/0262527 A1* 8/2021 Uehara ............. F16F 15/12313
2021/0262528 A1* 8/2021 Uehara ..................... F16D 3/12
2021/0270324 A1* 9/2021 Fujiwara ................... F16D 3/12
2021/0310522 A1* 10/2021 Uehara ..................... F16D 3/12
2021/0341020 A1* 11/2021 Herzog ................. F16F 15/121
2021/0355999 A1* 11/2021 Janz ........................ F16D 7/025
2022/0042550 A1* 2/2022 Uehara ............. F16F 15/12373
2022/0042573 A1* 2/2022 Yoshikawa ............... F16D 3/12
2022/0056981 A1* 2/2022 Uehara ............... F16F 15/1392
2022/0090634 A1* 3/2022 Senoue ..................... F16D 3/14
2022/0186785 A1* 6/2022 Tomita .............. F16F 15/12353
2022/0403892 A1* 12/2022 Saeki ........................ F16D 3/12
2022/0412410 A1* 12/2022 Uehara ............... F16F 15/1297
2023/0003260 A1* 1/2023 Uehara ..................... F16D 3/14
2023/0036835 A1* 2/2023 Uehara ............... F16F 15/1297
2023/0204077 A1* 6/2023 Uehara ..................... F16D 3/12
2023/0243388 A1* 8/2023 Koizumi ................. F16D 7/025
2023/0243389 A1* 8/2023 Uehara ................. F16F 15/123 464/68.1
2023/0258242 A1* 8/2023 Ishibashi ............. F16F 15/1297 464/46
2023/0313842 A1* 10/2023 Uehara ..................... F16D 3/12 464/46
2023/0400068 A1* 12/2023 Uehara ..................... F16D 3/12
2024/0068525 A1* 2/2024 Uehara ................... F16D 7/025

* cited by examiner

POWER TRANSMISSION DEVICE

CROSS-REFERENCE TO RELATED APPLICATIONS

This application is based on and claims the priority benefit of Japanese application No. 2024-192743 filed on Nov. 1, 2024, the contents of which are incorporated herein by reference.

TECHNICAL FIELD

The present invention relates to a power transmission device.

BACKGROUND

A damper device, exemplified as a power transmission device, is provided for absorbing vibrations of a prime mover such as an internal combustion engine. Japan Laid-open Patent Application Publication No. 2019-203580 describes a power transmission device that absorbs vibrations by torsion springs and inhibits an occurrence of resonance by friction forces generated when friction members are slid against a friction plate and so forth.

SUMMARY OF THE INVENTION

To make stable a friction coefficient when sliding between the friction plate and the counterpart component thereof occurs, the following process is required before the power transmission device is used: the friction plate and the counterpart component thereof are rotated relative to each other so as to be slid against each other. It is an object of the present invention to provide a power transmission device enabled to efficiently perform a process for making stable a friction coefficient in sliding between a friction plate and the counterpart component thereof.

A power transmission device according to a first aspect includes a first rotor, a second rotor, a support member, an elastic member, and a first friction plate. The second rotor is disposed to be rotatable relative to the first rotor. The support member is attached to the second rotor. The elastic member elastically couples the first rotor and the second rotor therethrough to each other. The first friction plate includes an outer slide portion and an inner slide portion. The outer slide portion is disposed radially outside the elastic member. The inner slide portion is disposed radially inside the elastic member. The inner slide portion is disposed between the second rotor and the support member in an axial direction. Each of the outer slide portion and the inner slide portion generates a friction force when the first friction plate is rotated relative to the second rotor.

According to the configuration, the first friction plate is supported by the second rotor and the support member; hence, the first friction plate, the second rotor, and the support member can be integrated as a subassembly. Further, when rotated relative to the second rotor, the first friction plate generates a friction force not only at the outer slide portion thereof but also at the inner slide portion thereof. Because of this, while the first friction plate, the second rotor, and the support member are assembled as the subassembly, friction forces can be generated by rotating the first friction plate. Consequently, it is possible to efficiently perform a process for making stable a friction coefficient when sliding between the first friction plate and a counterpart component thereof occurs.

A power transmission device according to a second aspect relates to the power transmission device according to the first aspect and further includes a first restriction mechanism. The first restriction mechanism is configured to restrict an angular range of relative rotation between the first friction plate and the first rotor.

A power transmission device according to a third aspect relates to the power transmission device according to the second aspect and is configured as follows. The first rotor includes a first window portion extending in a circumferential direction. The second rotor includes a second window portion extending in the circumferential direction. The elastic member is disposed in the first window portion and the second window portion. The first restriction mechanism is disposed radially outside an inner peripheral edge of the first window portion.

A power transmission device according to a fourth aspect relates to the power transmission device according to any of the first to third aspects and further includes a friction member and an urging member. The friction member is disposed between the second rotor and the support member. The friction member is contacted with the inner slide portion. The urging member urges the friction member toward the inner slide portion.

A power transmission device according to a fifth aspect relates to the power transmission device according to the fourth aspect and is configured as follows. The friction member is disposed between the first friction plate and the support member in the axial direction. The urging member is disposed between the support member and the friction member in the axial direction.

A power transmission device according to a sixth aspect relates to the power transmission device according to any of the first to fifth aspects and is configured as follows. The second rotor includes a first plate and a second plate. The first plate is disposed on a first side of the first rotor in the axial direction. The second plate is disposed on a second side of the first rotor in the axial direction. The second plate is configured to be rotated unitarily with the first plate. The first friction plate and the support member are disposed between the first plate and the first rotor in the axial direction.

A power transmission device according to a seventh aspect relates to the power transmission device according to the sixth aspect and further includes a side plate, a pressure plate, and a second friction plate. The second friction plate is attached to the second plate. The second friction plate is interposed between and held by the side plate and the pressure plate in the axial direction.

A power transmission device according to an eighth aspect relates to the power transmission device according to the sixth or seventh aspect and further includes a friction member. The friction member is disposed between the first rotor and the second plate in the axial direction. The friction member is configured to be rotated unitarily with the second plate. The friction member is contacted with the first rotor.

A power transmission device according to a ninth aspect relates to the power transmission device according to the eighth aspect and further includes an urging member. The urging member urges the friction member toward the first rotor.

Overall, according to the present invention, it is possible to efficiently perform a process for making stable a friction coefficient when sliding between a friction plate and a counterpart component thereof occurs.

DETAILED DESCRIPTION

A power transmission device 100 according to the present preferred embodiment will be hereinafter explained with reference to drawings. It should be noted that in the following explanation, the term "axial direction" refers to an extending direction of a rotational axis O of the power transmission device 100. On the other hand, the term "circumferential direction" refers to a circumferential direction of an imaginary circle about the rotational axis O, whereas the term "radial direction" refers to a radial direction of the imaginary circle about the rotational axis O. Further, the term "first side in the axial direction" means the right side in FIG. 2, whereas the term "second side in the axial direction" means the left side in FIG. 2.

Figure 1:
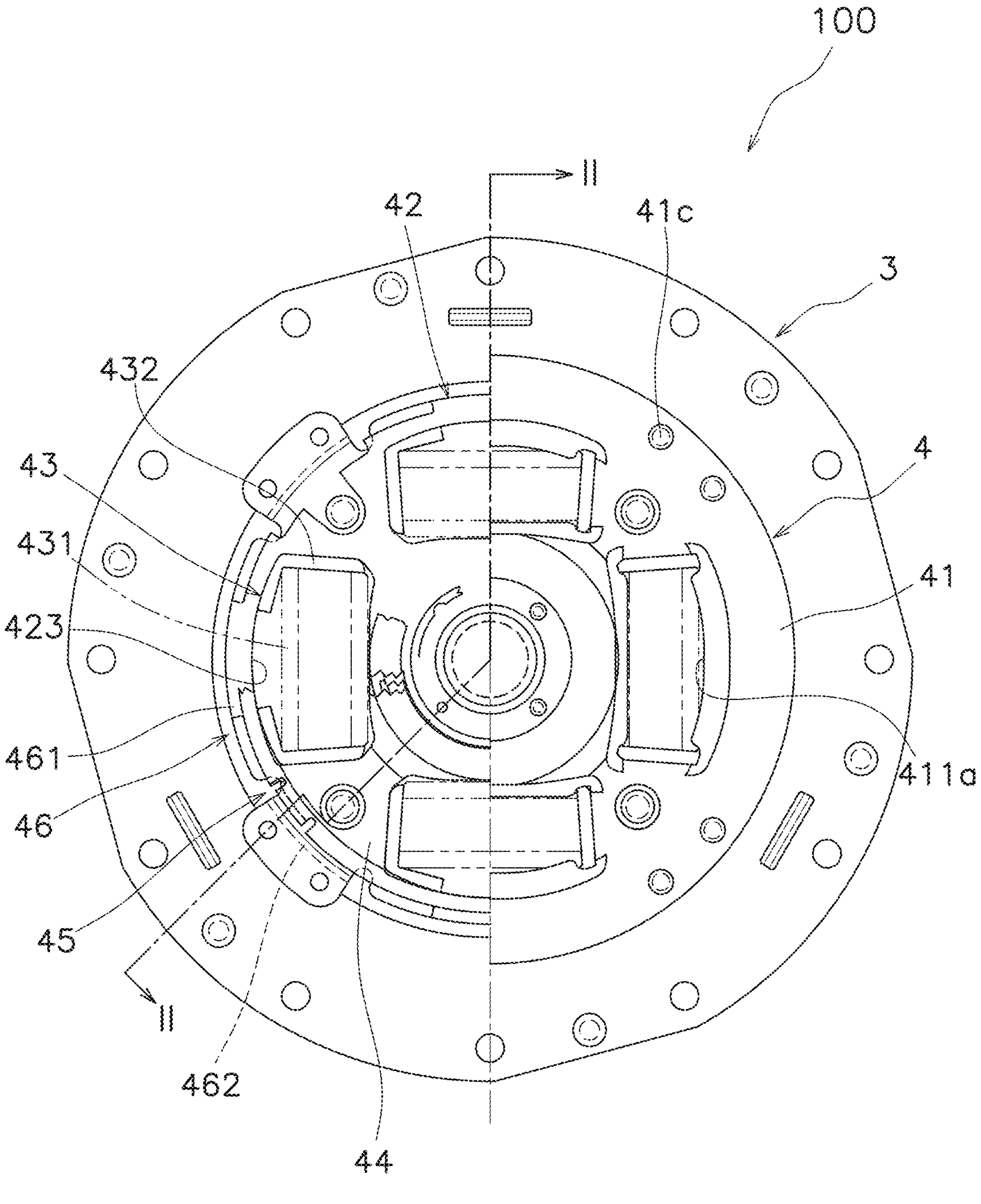
FIG. 1 is a front view of a power transmission device.
Figure 2:
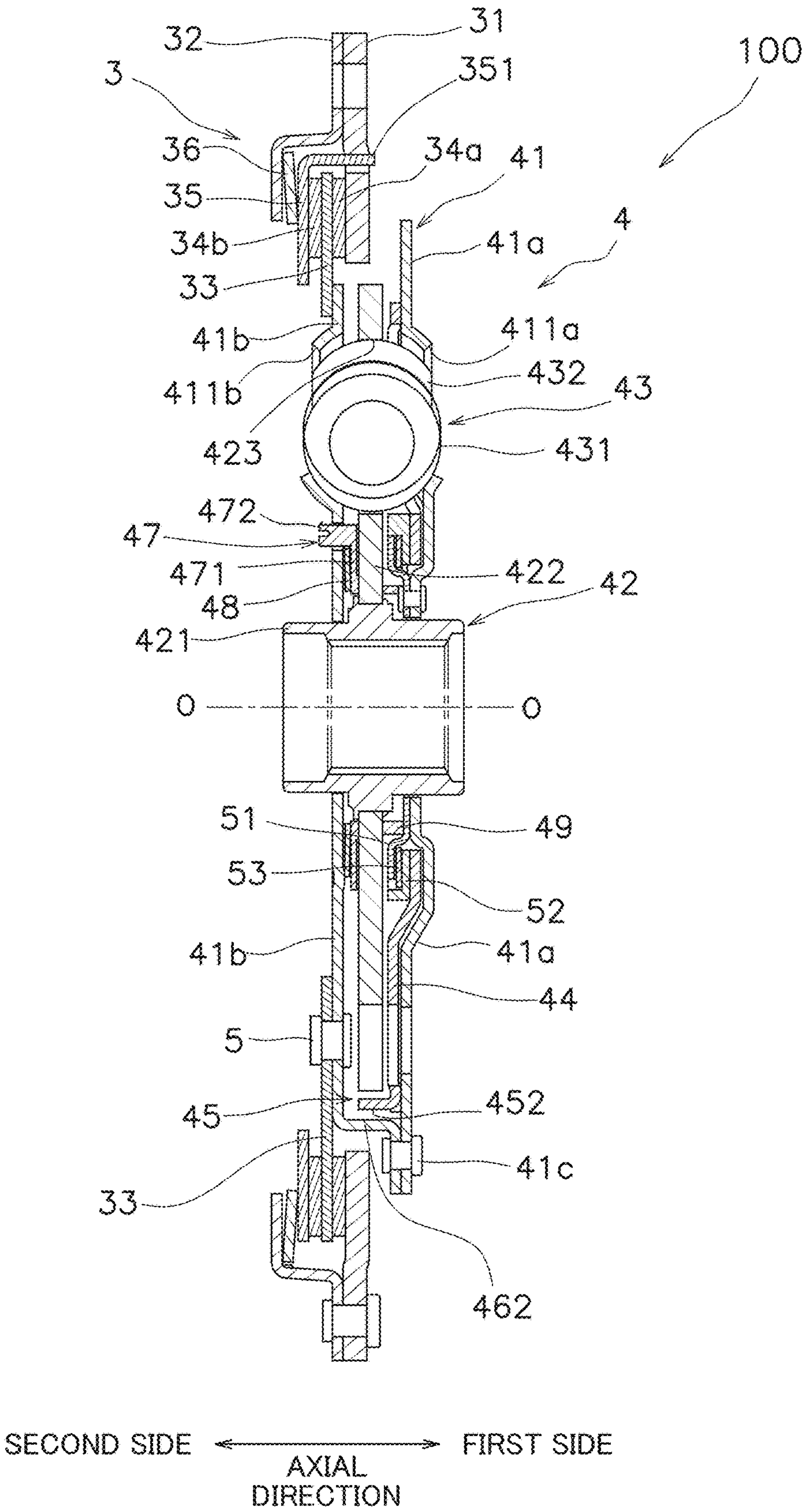
FIG. 2 is a cross-sectional view of the power transmission device taken along line II-II in FIG. 1.

FIG. 1 is a front view of the power transmission device 100, whereas FIG. 2 is a cross-sectional view of the power transmission device 100 taken along line II-II in FIG. 1. As shown in FIGS. 1 and 2, the power transmission device 100 includes a torque limiter unit 3, a damper unit 4, and a plurality of first fastening members 5. Basically, the torque limiter unit 3 and the damper unit 4 are rotated unitarily with each other. The power transmission device 100 is installed between an internal combustion engine (omitted in illustration) and an output-side member (omitted in illustration). It should be noted that the output-side member is, for instance, an electric motor, a transmission, or so forth. The power transmission device 100 is attached to a flywheel (omitted in illustration). For example, in FIG. 2, the internal combustion engine is disposed on the left side of the power transmission device 100, whereas the output-side member is disposed on the right side of the power transmission device 100. The power transmission device 100 is configured to limit a torque transmitted between the internal combustion engine and the output-side member and attenuate fluctuations in torque.

Damper Unit

The damper unit 4 is attached to the torque limiter unit 3 by the first fastening members 5. The damper unit 4 is configured to attenuate fluctuations in rotation. The damper unit 4 includes an input rotor 41 (exemplary second rotor), an output rotor 42 (exemplary first rotor), a plurality of elastic members 43, a first friction plate 44, a plurality of first restriction mechanisms 45, a plurality of second restriction mechanisms 46, a first friction member 47, a first urging member 48, a second friction member 49, a support member 51, a third friction member 52, and a second urging member 53.

<Input Rotor>

The input rotor 41 is rotated unitarily with a second friction plate 33 of the torque limiter unit 3 (to be described). The input rotor 41 is disposed to be rotatable relative to the output rotor 42.

The input rotor 41 includes a first plate 41*a* and a second plate 41*b*. Each of the first and second plates 41*a* and 41*b* is an annular member including a center hole. The first and second plates 41*a* and 41*b* are rotated unitarily with each other. Further, the first and second plates 41*a* and 41*b* are immovable relative to each other in the axial direction.

The first and second plates 41*a* and 41*b* are disposed away from each other at an interval in the axial direction. The first plate 41*a* is disposed on the first side of the second plate 41*b* in the axial direction.

The first plate 41*a* includes a plurality of second window portions 411*a*; likewise, the second plate 41*b* includes a plurality of second window portions 411*b*. It should be noted that in the present preferred embodiment, each of the first and second plates 41*a* and 41*b* includes four second window portions 411*a*, 411*b*; however, the window portions 411*a*, 411*b* are not limited in number to this.

Each second window portion 411*a*, 411*b* extends in the circumferential direction. The second window portions 411*a* and the second window portions 411*b* are respectively disposed away from each other at intervals in the circumferential direction. The second window portions 411*a* and the second window portions 411*b* are configured to accommodate the elastic members 43, respectively.

The input rotor 41 further includes a plurality of second fastening members 41*c*. The second fastening members 41*c* fasten the first plate 41*a* and the second plate 41*b* therethrough to each other at an outer peripheral part of the first plate 41*a* and that of the second plate 41*b*.

The second fastening members 41*c* are disposed on the first side of a first side plate 31 (to be described) in the axial direction. The second fastening members 41*c* overlap with the first side plate 31 as seen in the axial direction. The second fastening members 41*c* are, for instance, rivets.

<Output Rotor>

The output rotor 42 is configured to transmit the torque, inputted thereto from the input rotor 41, to the output-side member. The output rotor 42 is disposed axially between the first and second plates 41*a* and 41*b*. The output rotor 42 is disposed to be rotatable relative to the first and second plates 41*a* and 41*b*.

The output rotor 42 includes a hub 421 and a flange plate 422. The hub 421 and the flange plate 422 are separated as different members but may be integrated as a single member. The hub 421 and the flange plate 422 are rotated unitarily with each other.

The hub 421 has a tubular shape and is disposed in the center hole of the first plate 41*a* and that of the second plate 41*b*. The hub 421 extends in the axial direction. The hub 421 is provided with a spline hole, extending in the axial direction, in an inner peripheral part thereof. The spline hole enables an input shaft of the output-side member to be spline-coupled thereto.

The flange plate 422 radially extends from the outer peripheral surface of the hub 421. The flange plate 422 has an annular shape.

The flange plate 422 is disposed to be rotatable relative to the first and second plates 41*a* and 41*b*. The flange plate 422 is disposed axially between the first and second plates 41*a* and 41*b*. The first plate 41*a* is disposed on the first side of the flange plate 422 in the axial direction. The second plate 41*b* is disposed on the second side of the flange plate 422 in the axial direction.

The flange plate 422 includes a plurality of first window portions 423. Each first window portion 423 extends in the circumferential direction. It should be noted that in the present preferred embodiment, the flange plate 422 includes four first window portions 423; however, the first window portions 423 are not limited in number to this. The first window portions 423 are disposed away from each other at intervals in the circumferential direction. The first window portions 423 are configured to accommodate the elastic members 43, respectively. As seen in the axial direction, the first window portions 423 are disposed to overlap with both with the second window portions 411*a* and also with the second window portions 411*b*.

<Elastic Members>

The elastic members 43 are configured to elastically couple the input rotor 41 and the output rotor 42 therethrough to each other in the rotational direction. Each elastic member 43 is composed of, for instance, a coil spring 431 and a pair of spring seats 432. The coil spring 431 is interposed circumferentially between the pair of spring seats 432.

The elastic members 43 are accommodated in the first window portions 423 of the output rotor 42, respectively. Further, the elastic members 43 are accommodated in not only the second window portions 411*a* of the first plate 41*a* but also the second window portions 411*b* of the second plate 41*b*, respectively.

<Support Member>

Figure 3:
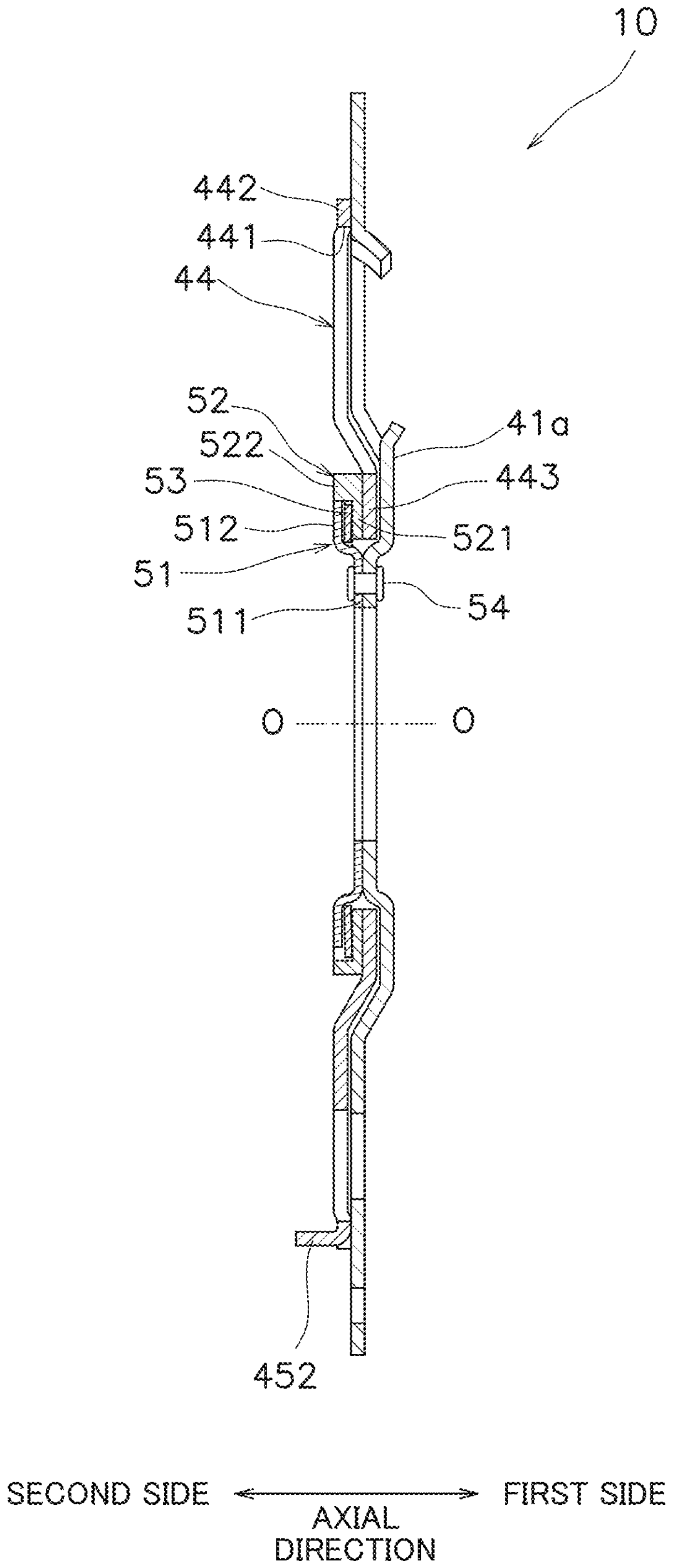
FIG. 3 is a cross-sectional view of a subassembly.

FIG. 3 is a cross-sectional view of a subassembly 10. It should be noted that the subassembly 10 is composed of the first plate 41*a*, the first friction plate 44, the support member 51, the third friction member 52, and the second urging member 53.

As shown in FIG. 3, the support member 51 is attached to the input rotor 41. When described in detail, the support member 51 is attached to the first plate 41*a*. The support member 51 is rotated unitarily with the first plate 41*a*.

The support member 51 is made in the shape of an annulus extending in the circumferential direction. The support member 51 is disposed radially inside the elastic members 43. The support member 51 is disposed axially between the first plate 41*a* and the flange plate 422.

The support member 51 includes an inner peripheral portion 511 and an outer peripheral portion 512. The inner peripheral portion 511 is in contact with the first plate 41*a* in the axial direction. The support member 51 is attached at the inner peripheral portion 511 to the first plate 41*a*. For example, the inner peripheral portion 511 and the first plate 41*a* are fastened to each other by fastening members 54 such as rivets.

The outer peripheral portion 512 is disposed away from the first plate 41*a* at an interval in the axial direction. The outer peripheral portion 512 is disposed on the second side of the inner peripheral portion 511 in the axial direction. The first friction plate 44, the third friction member 52, and the second urging member 53 are disposed axially between the outer peripheral portion 512 and the first plate 41*a*.

<First Friction Plate>

As shown in FIG. 2, the first friction plate 44 is disposed axially between the input rotor 41 and the output rotor 42. When described in detail, the first friction plate 44 is disposed axially between the first plate 41*a* and the flange plate 422. The first friction plate 44 is disposed to be rotatable relative to the input rotor 41 and the output rotor 42.

Figure 4:
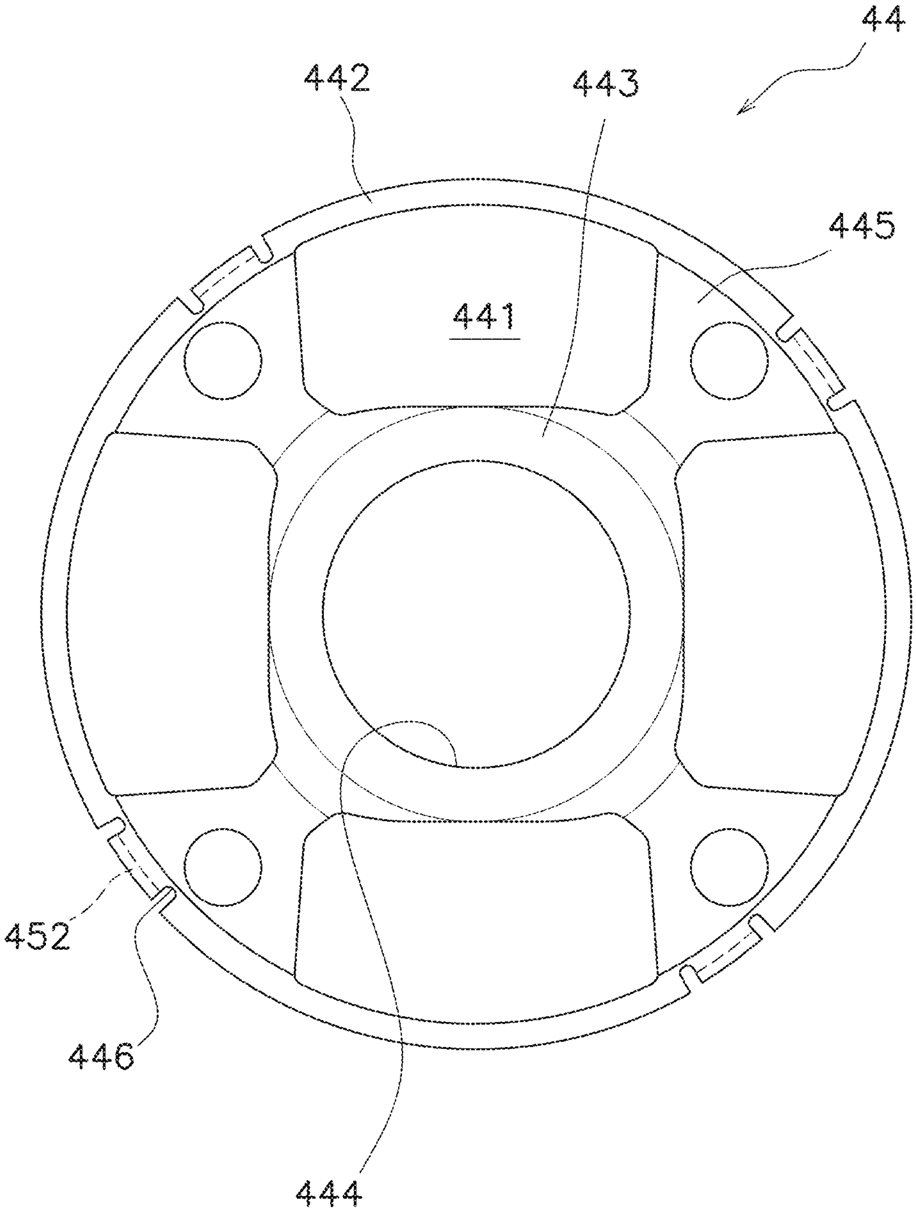
FIG. 4 is a front view of a first friction plate.

FIG. 4 is a front view of the first friction plate 44. As shown in FIGS. 3 and 4, the first friction plate 44 is supported between the support member 51 and the first plate 41*a*. The first friction plate 44 includes a plurality of accommodation holes 441, an outer slide portion 442, and an inner slide portion 443. The first friction plate 44 has an annular shape. In other words, the first friction plate 44 includes an opening 444 in the middle thereof.

Each accommodation hole 441 extends in the circumferential direction. It should be noted that in the present preferred embodiment, the first friction plate 44 includes four accommodation holes 441; however, the accommodation holes 441 are not limited in number to this. The accommodation holes 441 are disposed away from each other at intervals in the circumferential direction. The accommodation holes 441 are configured to accommodate the elastic members 43, respectively. As seen in the axial direction, the accommodation holes 441 are disposed to overlap with the first window portions 423, the second window portions 411*a*, and the second window portions 411*b*, respectively.

The outer peripheral part of the first friction plate 44 is provided as the outer slide portion 442. The outer slide portion 442 is made in the shape of an annulus extending in the circumferential direction. The outer slide portion 442 protrudes to the first side in the axial direction.

The outer slide portion 442 is in contact with the first plate 41*a*. Excluding the outer slide portion 442, the other part of the first friction plate 44 is disposed away from the first plate 41*a* at an interval in the axial direction. It should be noted that, excluding the outer slide portion 442, the other part of the first friction plate 44 may be in contact with the first plate 41*a*. The outer slide portion 442 is not in contact with the flange plate 422. In other words, the outer slide portion 442 is disposed away from the flange plate 422 at an interval in the axial direction.

The outer slide portion 442 is disposed radially outside the elastic members 43. The outer slide portion 442 is disposed radially outside the accommodation holes 441. When the first friction plate 44 is rotated relative to the input rotor 41, the outer slide portion 442 generates a friction force. Speaking in detail, when the first friction plate 44 is rotated relative to the first plate 41*a*, the outer slide portion 442 generates the friction force by sliding against the first plate 41*a*.

The inner peripheral part of the first friction plate 44 is provided as the inner slide portion 443. The inner slide portion 443 is made in the shape of an annulus extending in the circumferential direction. The inner slide portion 443 is not in contact with the first plate 41*a*. In other words, the inner slide portion 443 is disposed away from the first plate 41*a* at an interval in the axial direction. It should be noted that the inner slide portion 443 may be in contact with the first plate 41*a*.

The inner slide portion 443 is disposed away from the support member 51 at an interval in the axial direction. The inner slide portion 443 is disposed axially between the support member 51 and the first plate 41*a*. When described in detail, the inner slide portion 443 is disposed axially between the outer peripheral portion 512 of the support member 51 and the first plate 41*a*.

The inner slide portion 443 is disposed radially inside the elastic members 43. The inner slide portion 443 is disposed radially inside the accommodation holes 441. When the first friction plate 44 is rotated relative to the input rotor 41, the inner slide portion 443 generates a friction force. Speaking in detail, when the first friction plate 44 is rotated relative to the first plate 41*a*, the inner slide portion 443 generates the friction force by sliding against the third friction member 52.

The first friction plate 44 includes a plurality of contact portions 445. The contact portions 445 are disposed radially between the outer slide portion 442 and the inner slide portion 443. Each contact portion 445 is disposed between each pair of accommodation holes 441 circumferentially adjacent to each other.

Each contact portion 445 is disposed between each pair of elastic members 43 circumferentially adjacent to each other. Each contact portion 445 is in contact with each pair of elastic members 43 adjacent to each other in the circumferential direction. In other words, each contact portion 445 is interposed between each pair of elastic members 43.

<Third Friction Member>

As shown in FIG. 3, the third friction member 52 is made in the shape of an annulus extending in the circumferential direction. The third friction member 52 is disposed axially between the first plate 41*a* and the support member 51. When described in detail, the third friction member 52 is disposed axially between the first friction plate 44 and the support member 51.

The third friction member 52 includes a body 521 and a plurality of engaging portions 522. The body 521 is made in the shape of an annulus extending in the circumferential direction. The body 521 is disposed axially between the outer peripheral portion 512 of the support member 51 and the inner slide portion 443 of the first friction plate 44. The body 521 is in contact with the inner slide portion 443 of the first friction plate 44. When the first friction plate 44 is rotated relative to the first plate 41*a*, the body 521 of the third friction member 52 is slid against the inner slide portion 443 of the first friction plate 44.

The engaging portions 522 are disposed away from each other at intervals in the circumferential direction. The engaging portions 522 extend from the body 521 to the second side in the axial direction. The engaging portions 522 are engaged with the support member 51. Because of this, the third friction member 52 is rotated unitarily with the support member 51.

<Second Urging Member>

The second urging member 53 urges the third friction member 52 toward the inner slide portion 443. In other words, the second urging member 53 urges the third friction member 52 to the first side in the axial direction. The second urging member 53 is disposed axially between the outer peripheral portion 512 of the support member 51 and the body 521 of the third friction member 52. The second urging member 53 is, for instance, a disc spring.

<First Restriction Mechanisms>

Figure 5:
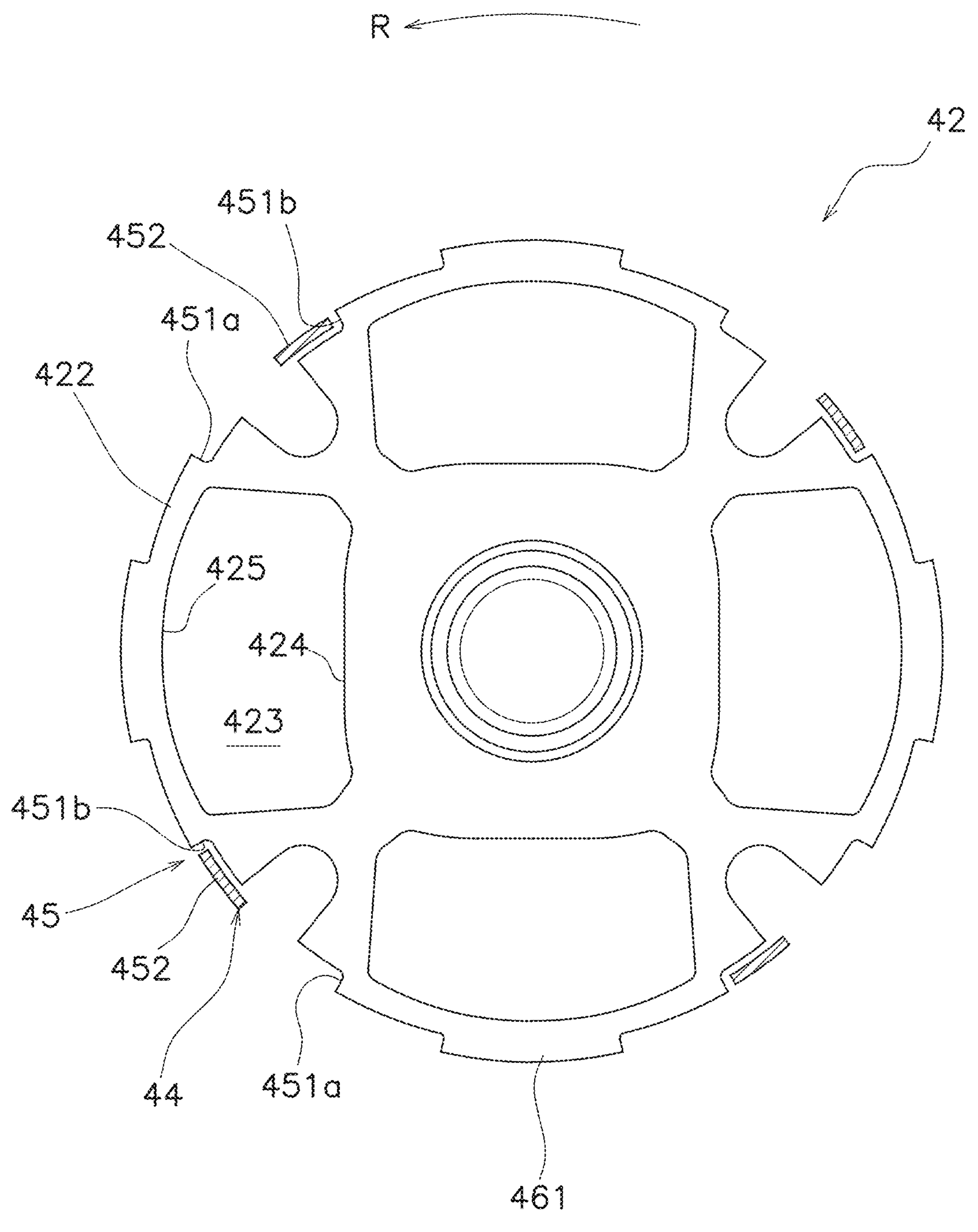
FIG. 5 is a front view of an output rotor.

FIG. 5 is a front view of the output rotor 42 for explaining the first restriction mechanisms 45. FIG. 5 shows the output rotor 42 and part of the first friction plate 44. As shown in FIG. 5, the first restriction mechanisms 45 are configured to restrict an angular range of relative rotation between the first friction plate 44 and the output rotor 42. Because of this, the first friction plate 44 is rotatable relative to the output rotor 42 only within a predetermined angular range. In other words, the first friction plate 44 is non-rotatable relative to the output rotor 42 at an angle exceeding the predetermined angular range.

When the first restriction mechanisms 45 are not being actuated, in other words, when an angle of torsion (relative rotation) between the input rotor 41 and the output rotor 42 falls within the angular range restricted by the first restriction mechanisms 45, the first friction plate 44, basically speaking, is rotated integrally with the input rotor 41, while being rotated relative to the output rotor 42. By contrast, when the first restriction mechanisms 45 are being actuated, in other words, when the angle of torsion between the input rotor 41 and the output rotor 42 reaches either the upper or lower limit of the angular range restricted by the first restriction mechanisms 45, the first friction plate 44 is rotated unitarily with the output rotor 42, while being rotated relative to the input rotor 41. It should be noted that in the present preferred embodiment, the power transmission device 100 includes four first restriction mechanisms 45; however, the first restriction mechanisms 45 are not limited in number to this.

The first restriction mechanisms 45 are disposed radially outside inner peripheral edges 424 of the first window portions 423. Further, the first restriction mechanisms 45 are disposed radially outside outer peripheral edges 425 of the first window portions 423. The first restriction mechanisms 45 are disposed radially outside the first fastening members 5.

Each first restriction mechanism 45 includes a first stopper surface 451*a*, a second stopper surface 451*b*, and a pawl portion 452.

The first stopper surfaces 451*a* and the second stopper surfaces 451*b* are provided on the output rotor 42. When described in detail, the first stopper surfaces 451*a* and the second stopper surfaces 451*b* are provided on the flange plate 422. The first stopper surfaces 451*a* and the second stopper surfaces 451*b* compose part of the flange plate 422. The first stopper surfaces 451*a* and the second stopper surfaces 451*b* are disposed in common on the circumference of an imaginary circle.

The first stopper surfaces 451*a* and the second stopper surfaces 451*b* are disposed radially outside the inner peripheral edges 424 of the first window portions 423. Further, the first stopper surfaces 451*a* and the second stopper surfaces 451*b* are disposed radially outside the outer peripheral edges 425 of the first window portions 423. The first stopper surfaces 451*a* and the second stopper surfaces 451*b* are disposed radially outside the first fastening members 5.

The first and second stopper surfaces 451*a* and 451*b* in each first restriction mechanism 45 are oriented in the circumferential direction. The first and second stopper surfaces 451*a* and 451*b* are provided to face each other. When the first friction plate 44 is rotated relative to the output rotor 42 in a forward rotational direction R, the first stopper surface 451*a* is contacted with the pawl portion 452. When the first friction plate 44 is rotated relative to the output rotor 42 in a reverse rotational direction, the second stopper surface 451*b* is contacted with the pawl portion 452. It should be noted that the forward rotational direction R is defined as a direction in which the power transmission device 100 is rotated in forward traveling of a vehicle in which the power transmission device 100 is installed, whereas the reverse rotational direction is defined as a rotational direction oriented reverse to the forward rotational direction R.

The pawl portions 452 are provided on the first friction plate 44. The pawl portions 452 compose part of the first friction plate 44. The pawl portions 452 extend from the outer slide portion 442 of the first friction plate 44 toward the flange plate 422 in the axial direction. The pawl portions 452 are formed by bending in part the first friction plate 44 to the second side in the axial direction. It should be noted that the outer slide portion 442 is provided with a plurality of cutout portions 446 such that each pawl portion 452 is interposed circumferentially between each pair of cutout portions 446.

The pawl portions 452 are disposed radially outside the inner peripheral edges 424 of the first window portions 423. Further, the pawl portions 452 are disposed radially outside the outer peripheral edges 425 of the first window portions 423. The pawl portions 452 are disposed radially outside the first fastening members 5.

The pawl portion 452 is disposed circumferentially between the first and second stopper surfaces 451*a* and 451*b* in each first restriction mechanism 45. The pawl portion 452 is opposed to the first and second stopper surfaces 451*a* and 451*b* at intervals in the circumferential direction. The pawl portion 452 is disposed on the circumference of the imaginary circle that the first and second stopper surfaces 451*a* and 451*b* are disposed.

The interval between the pawl portion 452 and the first stopper surface 451*a* and that between the pawl portion 452 and the second stopper surface 451*b* are different in magnitude from each other. Specifically, the interval between the first friction plate 44 and the first stopper surface 451*a* is greater in magnitude than that between the first friction plate 44 and the second stopper surface 451*b*.

<Second Restriction Mechanisms>

As shown in FIGS. 1 and 2, the second restriction mechanisms 46 are configured to restrict the angular range of relative rotation between the input rotor 41 and the output rotor 42. It should be noted that the angular range of relative rotation between the input rotor 41 and the output rotor 42 to be restricted by the second restriction mechanisms 46 is greater in magnitude than that between the first friction plate 44 and the output rotor 42 to be restricted by the first restriction mechanisms 45.

The second restriction mechanisms 46 are disposed radially outside the first restriction mechanisms 45. In other words, the first restriction mechanisms 45 are disposed radially inside the second restriction mechanisms 46.

The second restriction mechanisms 46 include a plurality of protruding portions 461 and a plurality of stopper portions 462. The protruding portions 461 are provided on the output rotor 42. The protruding portions 461 compose part of the output rotor 42. The protruding portions 461 protrude radially outward from the flange plate 422 of the output rotor 42.

The stopper portions 462 are provided on the input rotor 41. The stopper portions 462 compose part of the input rotor 41. When described in detail, the stopper portions 462 compose part of the second plate 41*b*. The stopper portions 462 are provided as portions extending from the body of the second plate 41*b* in the axial direction. The stopper portions 462 are formed by bending in part the second plate 41*b* in the axial direction.

Each stopper portion 462 is disposed circumferentially between each pair of protruding portions 461 circumferentially adjacent to each other. Each stopper portion 462 is opposed to both of each pair of protruding portions 461 at intervals in the circumferential direction. In other words, each stopper portion 462 is disposed on the circumference of an imaginary circle that each pair of protruding portions 461 is disposed.

<First Friction Member>

The first friction member 47 is configured to be rotated unitarily with the input rotor 41. The first friction member 47 is disposed axially between the second plate 41*b* and the flange plate 422. When described in detail, the first friction member 47 is disposed axially between the first urging member 48 and the flange plate 422. The first friction member 47 is made in the shape of an annulus extending in the circumferential direction. The first friction member 47 includes a body 471 having an annular shape and at least one engaging portion 472 extending from the body 471 in the axial direction.

The body 471 is in contact with the flange plate 422. The body 471 is disposed axially between the first urging member 48 and the flange plate 422. When the body 471 and the flange plate 422 are slid against each other, frictional attenuation is caused, whereby fluctuations in torque are attenuated. The at least one engaging portion 472 is engaged with the second plate 41*b* of the input rotor 41. Because of this, the first friction member 47 is rotated unitarily with the second plate 41*b*.

<First Urging Member>

The first urging member 48 is disposed axially between the flange plate 422 and the second plate 41*b*. When described in detail, the first urging member 48 is disposed axially between the first friction member 47 and the second plate 41*b*. The first urging member 48 urges the flange plate 422 and the second plate 41*b* to make both the plates 422 and 41*b* separate from each other in the axial direction. The first urging member 48 urges the first friction member 47 toward the flange plate 422. The first urging member 48 is, for instance, a disc spring.

<Second Friction Member>

The second friction member 49 is made in the shape of an annulus extending in the circumferential direction. The second friction member 49 is disposed axially between the support member 51 and the flange plate 422. The second friction member 49 is in contact with both the support member 51 and the flange plate 422. The second friction member 49 is disposed radially inside the elastic members 43.

The second friction member 49 is rotatable relative to both the support member 51 and the flange plate 422. When the input rotor 41 and the output rotor 42 are rotated relative to each other, the second friction member 49 is rotated unitarily with one of the support member 51 and the flange plate 422, which is greater in frictional resistance against the second friction member 49 than the other. It should be noted that in the present preferred embodiment, the second friction member 49 is rotated unitarily with the support member 51, whereby a friction force is generated between the second friction member 49 and the flange plate 422. The second friction member 49 may be configured to be rotated unitarily with the support member 51, or alternatively, may be configured to be rotated unitarily with the flange plate 422.

The friction force generated between the second friction member 49 and the flange plate 422 or the friction force generated between the second friction member 49 and the support member 51 is smaller in magnitude than that generated between the outer slide portion 442 of the first friction plate 44 and the first plate 41*a*.

Torque Limiter Unit

As shown in FIG. 2, the torque limiter unit 3 is disposed to be rotatable about the rotational axis O. The torque limiter unit 3 is disposed on the second side of the damper unit 4 in the axial direction. The torque limiter unit 3 has an annular shape. The torque limiter unit 3 is attached to the flywheel and so forth by a plurality of bolts.

The torque limiter unit 3 is configured to limit the torque transmitted between the flywheel and the damper unit 4. In other words, the torque limiter unit 3 is configured to restrict transmission of a torque in the power transmission device 100 when the torque has a magnitude of greater than or equal to a predetermined value.

The torque limiter unit 3 includes the first side plate 31 (exemplary side plate), a second side plate 32, the second friction plate 33, a first friction material 34*a*, a second friction material 34*b*, a pressure plate 35, and a disc spring 36.

<First and Second Side Plates>

The first and second side plates 31 and 32 are attached to the flywheel. The first and second side plates 31 and 32 are rotated unitarily with the flywheel. Each of the first and second side plates 31 and 32 has an annular shape. The second side plate 32 is disposed away from the first side plate 31 at an interval in the axial direction. The second side plate 32 is disposed on the second side of the first side plate 31 in the axial direction. The second friction plate 33, the first friction material 34*a*, the second friction material 34*b*, the pressure plate 35, and the disc spring 36 are disposed between the first and second side plates 31 and 32. The second side plate 32 is smaller in plate thickness than the first side plate 31.

<Second Friction Plate>

The second friction plate 33 has an annular plate. The second friction plate 33 is disposed to be rotatable about the rotational axis O. The second friction plate 33 is interposed between and held by the first side plate 31 and the pressure plate 35 in the axial direction. The second friction plate 33 is engaged by friction with the first side plate 31 through the first friction material 34*a*. Further, the second friction plate 33 is engaged by friction with the pressure plate 35 through the second friction material 34*b*.

The second friction plate 33 is attached to the input rotor 41. When described in detail, the second friction plate 33 is attached to the second plate 41*b*. The second friction plate 33 is attached to the second plate 41*b* by the first fastening members 5. The second friction plate 33 is rotated unitarily with the input rotor 41.

<Friction Materials>

Each of the first and second friction materials 34*a* and 34*b* is made in the shape of an annulus extending in the circumferential direction. The first friction material 34*a* is disposed on the first side of the second friction plate 33 in the axial direction. The second friction material 34*b* is disposed on the second side of the second friction plate 33 in the axial direction. The first and second friction materials 34*a* and 34*b* are attached to the second friction plate 33.

<Pressure Plate>

The pressure plate 35 is made in the shape of an annulus extending in the circumferential direction. The pressure plate 35 is configured to press the second friction plate 33. The pressure plate 35 presses the second friction plate 33 through the second friction material 34*b*. The pressure plate 35 is disposed axially between the second friction material 34*b* and the disc spring 36.

The pressure plate 35 is configured to be rotated unitarily with the first side plate 31. When described in detail, the pressure plate 35 includes a plurality of engaging pawls 351 engaged with the first side plate 31.

<Disc Spring>

The disc spring 36 is disposed axially between the second side plate 32 and the pressure plate 35. The disc spring 36 urges the pressure plate 35 toward the second friction plate 33. In other words, the disc spring 36 urges the pressure plate 35 to the first side in the axial direction. Accordingly, the second friction plate 33, the first friction material 34*a*, and the second friction material 34*b* are sandwiched by the pressure plate 35 and the first side plate 31.

<First Fastening Members>

The first fastening members 5 fasten the second friction plate 33 and the input rotor 41 therethrough to each other. When described in detail, the first fastening members 5 fasten the second friction plate 33 and the second plate 41*b* therethrough to each other.

<Action>

Figure 6:
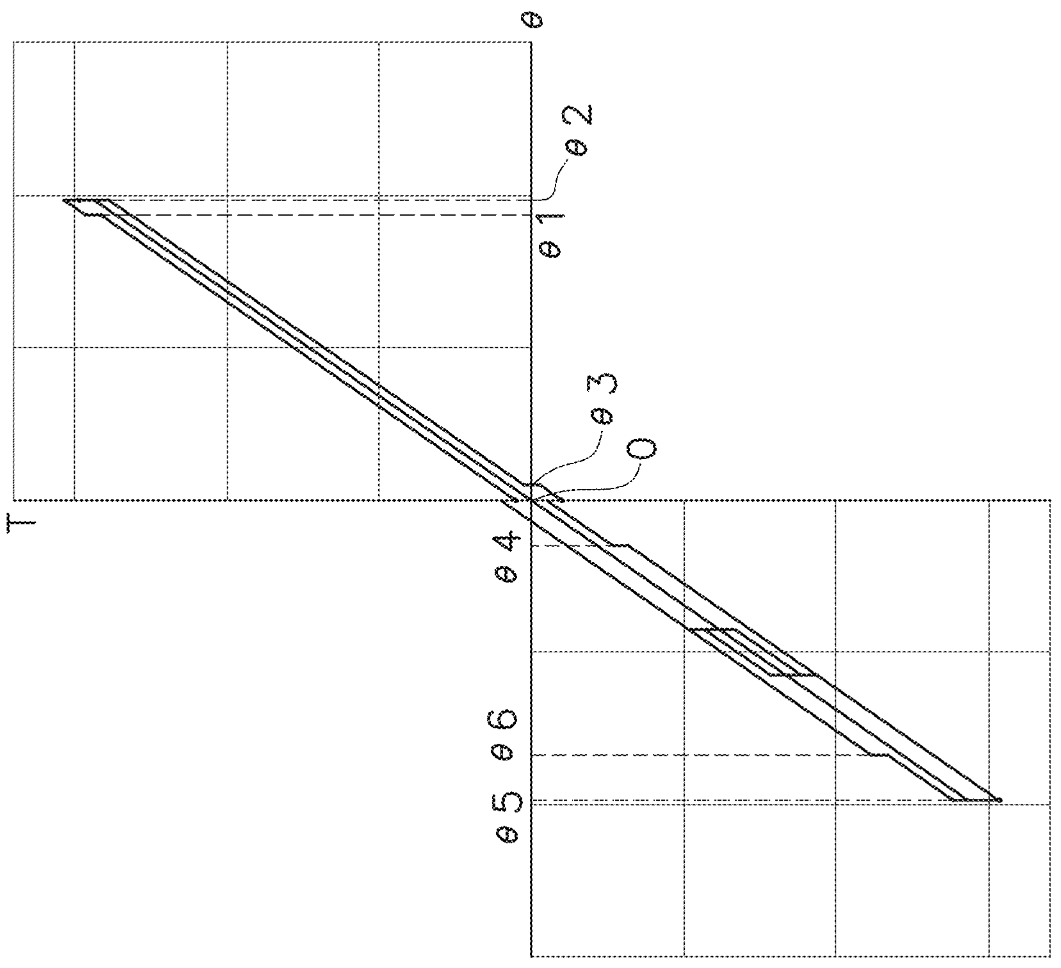
FIG. 6 is a chart showing torque characteristics.

FIG. 6 is a chart showing a relation between torsional angle and torsional torque. It should be noted that in FIG. 6, the horizontal axis indicates the angle of torsion between the input rotor 41 and the output rotor 42, whereas the vertical axis indicates a torsional torque to be applied to the damper unit 4.

As shown in FIG. 6, until the angle of torsion reaches θ1 from Θ, the first restriction mechanisms 45 are not being actuated; in other words, the pawl portions 452 are not in contact with the first stopper surfaces 451*a*, respectively. Hence, the first friction plate 44 is rotatable relative to the output rotor 42 and is rotated unitarily with the input rotor 41. Because of this, a friction force is generated between the second friction member 49 and the flange plate 422, while a friction force is generated between the first friction member 47 and the flange plate 422.

When the angle of torsion has reached θ1, the first restriction mechanisms 45 are actuated; in other words, the pawl portions 452 are contacted with the first stopper surfaces 451*a*, respectively. Therefore, until the angle of torsion reaches θ2 from θ1, the first friction plate 44 is non-rotatable relative to the output rotor 42 and is rotated relative to the input rotor 41. Because of this, a friction force is generated between the outer slide portion 442 of the first friction plate 44 and the first plate 41*a*; a friction force is generated between the inner slide portion 443 of the first friction plate 44 and the third friction member 52; a friction force is generated between the second friction member 49 and the flange plate 422; a friction force is generated between the first friction member 47 and the flange plate 422. It should be noted that, when the angle of torsion has reached θ2, the second restriction mechanisms 46 are actuated; in other words, the stopper portions 462 are contacted with the protruding portions 461, respectively. Hence, the input rotor 41 is made non-rotatable relative to the output rotor 42.

Until the angle of torsion reaches θ3 from θ2, the input rotor 41 and the first friction plate 44 are rotated unitarily with each other; hence, a friction force is generated between the second friction member 49 and the flange plate 422, while a friction force is generated between the first friction member 47 and the flange plate 422.

When the angle of torsion has reached θ3, each of the contact portions 445 of the first friction plate 44 is contacted with one of the pair of elastic members 43 adjacent thereto; hence, until the angle of torsion reaches Θ from θ3, the first friction plate 44 is rotated relative to the input rotor 41. Because of this, a friction force is generated between the outer slide portion 442 of the first friction plate 44 and the first plate 41*a*; a friction force is generated between the inner slide portion 443 of the first friction plate 44 and the third friction member 52; a friction force is generated between the second friction member 49 and the flange plate 422; a friction force is generated between the first friction member 47 and the flange plate 422.

When the angle of torsion has reached Θ, each of the contact portions 445 of the first friction plate 44 is contacted with the other of the pair of elastic members 43 adjacent thereto and is thereby interposed between the pair of elastic members 43 adjacent thereto, whereby the power transmission device 100 is restored to the initial condition. Until the angle of torsion reaches θ4 from Θ, the first restriction mechanisms 45 are not being actuated; in other words, the pawl portions 452 are not in contact with the second stopper surfaces 451*b*, respectively. Hence, the first friction plate 44 is rotatable relative to the output rotor 42 and is rotated unitarily with the input rotor 41. Because of this, a friction force is generated between the second friction member 49 and the flange plate 422, while a friction force is generated between the first friction member 47 and the flange plate 422.

When the angle of torsion has reached θ4, the first restriction mechanisms 45 are actuated; in other words, the pawl portions 452 are contacted with the second stopper surfaces 451*b*, respectively. Therefore, until the angle of torsion reaches θ5 from θ4, the first friction plate 44 is non-rotatable relative to the output rotor 42 and is rotated relative to the input rotor 41. Because of this, a friction force is generated between the outer slide portion 442 of the first friction plate 44 and the first plate 41*a*; a friction force is generated between the inner slide portion 443 of the first friction plate 44 and the third friction member 52; a friction force is generated between the second friction member 49 and the flange plate 422; a friction force is generated between the first friction member 47 and the flange plate 422. It should be noted that, when the angle of torsion has reached θ5, the second restriction mechanisms 46 are actuated; in other words, the stopper portions 462 are contacted with the protruding portions 461, respectively. Hence, the input rotor 41 is made non-rotatable relative to the output rotor 42.

Until the angle of torsion reaches θ6 from θ5, the input rotor 41 and the first friction plate 44 are rotated unitarily with each other. Because of this, a friction force is generated between the second friction member 49 and the flange plate 422, while a friction force is generated between the first friction member 47 and the flange plate 422.

When the angle of torsion has reached θ6, each of the contact portions 445 of the first friction plate 44 is contacted with one of the pair of elastic members 43 adjacent thereto; hence, until the angle of torsion reaches Θ from θ6, the first friction plate 44 is rotated relative to the input rotor 41. Because of this, a friction force is generated between the outer slide portion 442 of the first friction plate 44 and the first plate 41*a*; a friction force is generated between the inner slide portion 443 of the first friction plate 44 and the third friction member 52; a friction force is generated between the second friction member 49 and the flange plate 422; a friction force is generated between the first friction member 47 and the flange plate 422.

When the angle of torsion has reached Θ, each of the contact portions 445 of the first friction plate 44 is contacted with the other of the pair of elastic members 43 adjacent thereto and is thereby interposed between the pair of elastic members 43 adjacent thereto, whereby the power transmission device 100 is restored to the initial condition.

Modifications

One preferred embodiment of the present invention has been explained above. However, the present invention is not limited to the above, and a variety of changes can be made without departing from the gist of the present invention. It should be noted that basically speaking, respective modifications to be described are applicable simultaneously.

(a) In the preferred embodiment described above, the output rotor 42 has been exemplified as the first rotor, whereas the input rotor 41 has been exemplified as the second rotor; however, the power transmission device 100 is not limited in configuration to this. For example, the output rotor 42 may be exemplified as the second rotor, whereas the input rotor 41 may be exemplified as the first rotor. In other words, the support member 51 may be attached to the flange plate 422 of the output rotor 42; the outer slide portion 442 of the first friction plate 44 may generate a friction force together with the flange plate 422 therebetween; the inner slide portion 443 of the first friction plate may be disposed between the flange plate 422 and the support member 51.

(b) In the preferred embodiment described above, the support member 51 is separated from the first plate 41*a* as a discrete member; alternatively, the support member 51 may be integrated with the first plate 41*a* to form a single integrated member.

LIST OF REFERENCE NUMERALS

31: First side plate, 33: Second friction plate, 35: Pressure plate, 36: Disc spring, 41: Input rotor, 41*a*: First plate, 411*a*: Second window portion, 41*b*: Second plate, 411*b*: Second window portion, 42: Output rotor, 421: Hub, 422: Flange plate, 423: First window portion, 424: Inner peripheral edge, 43: Elastic member, 44: First friction plate, 442: Outer slide portion, 443: Inner slide portion, 45: First restriction mechanism, 47: First friction member, 48: First urging member, 51: Support member, 52: Third friction member, 53: Second urging member, 100: Power transmission device

The invention claimed is:

1. A power transmission device comprising:

a first rotor;

a second rotor disposed to be rotatable relative to the first rotor;

a support member attached to the second rotor;

an elastic member elastically coupling the first rotor and the second rotor therethrough to each other; and a first friction plate including an outer slide portion and an inner slide portion, the outer slide portion disposed radially outside the elastic member, the inner slide portion disposed radially inside the elastic member, the inner slide portion disposed between the second rotor and the support member in an axial direction, wherein each of the outer slide portion and the inner slide portion is configured to generate a friction force when the first friction plate is rotated relative to the second rotor.

2. The power transmission device according to claim 1, further comprising:

a first restriction mechanism configured to restrict an angular range of relative rotation between the first friction plate and the first rotor.

3. The power transmission device according to claim 2, wherein the first rotor includes a first window portion extending in a circumferential direction, the second rotor includes a second window portion extending in the circumferential direction, the elastic member is disposed in the first window portion and the second window portion, and the first restriction mechanism is disposed radially outside an inner peripheral edge of the first window portion.

4. The power transmission device according to claim 3, further comprising:

a friction member disposed between the second rotor and the support member, the friction member contacted with the inner slide portion; and an urging member urging the friction member toward the inner slide portion.

5. The power transmission device according to claim 4, wherein the friction member is disposed between the first friction plate and the support member in the axial direction, and the urging member is disposed between the support member and the friction member in the axial direction.

6. The power transmission device according to claim 3, wherein the second rotor includes a first plate and a second plate, the first plate disposed on a first side of the first rotor in the axial direction, the second plate disposed on a second side of the first rotor in the axial direction, the second plate configured to be rotated unitarily with the first plate, and the first friction plate and the support member are disposed between the first plate and the first rotor in the axial direction.

7. The power transmission device according to claim 2, further comprising:

a friction member disposed between the second rotor and the support member, the friction member contacted with the inner slide portion; and an urging member urging the friction member toward the inner slide portion.

8. The power transmission device according to claim 7, wherein the friction member is disposed between the first friction plate and the support member in the axial direction, and the urging member is disposed between the support member and the friction member in the axial direction.

9. The power transmission device according to claim 2, wherein the second rotor includes a first plate and a second plate, the first plate disposed on a first side of the first rotor in the axial direction, the second plate disposed on a second side of the first rotor in the axial direction, the second plate configured to be rotated unitarily with the first plate, and the first friction plate and the support member are disposed between the first plate and the first rotor in the axial direction.

10. The power transmission device according to claim 9, further comprising:

a side plate;

a pressure plate; and a second friction plate attached to the second plate, the second friction plate interposed between and held by the side plate and the pressure plate in the axial direction.

11. The power transmission device according to claim 10, further comprising:

a friction member disposed between the first rotor and the second plate in the axial direction, the friction member configured to be rotated unitarily with the second plate, the friction member contacted with the first rotor.

12. The power transmission device according to claim 11, further comprising:

an urging member urging the friction member toward the first rotor.

13. The power transmission device according to claim 1, further comprising:

a friction member disposed between the second rotor and the support member, the friction member contacted with the inner slide portion; and an urging member urging the friction member toward the inner slide portion.

14. The power transmission device according to claim 13, wherein the friction member is disposed between the first friction plate and the support member in the axial direction, and the urging member is disposed between the support member and the friction member in the axial direction.

15. The power transmission device according to claim 14, wherein the second rotor includes a first plate and a second plate, the first plate disposed on a first side of the first rotor in the axial direction, the second plate disposed on a second side of the first rotor in the axial direction, the second plate configured to be rotated unitarily with the first plate, and the first friction plate and the support member are disposed between the first plate and the first rotor in the axial direction.

16. The power transmission device according to claim 13, wherein the second rotor includes a first plate and a second plate, the first plate disposed on a first side of the first rotor in the axial direction, the second plate disposed on a second side of the first rotor in the axial direction, the second plate configured to be rotated unitarily with the first plate, and the first friction plate and the support member are disposed between the first plate and the first rotor in the axial direction.

17. The power transmission device according to claim 1, wherein the second rotor includes a first plate and a second plate, the first plate disposed on a first side of the first rotor in the axial direction, the second plate disposed on a second side of the first rotor in the axial direction, the second plate configured to be rotated unitarily with the first plate, and the first friction plate and the support member are disposed between the first plate and the first rotor in the axial direction.

18. The power transmission device according to claim 17, further comprising:

a side plate;

a pressure plate; and a second friction plate attached to the second plate, the second friction plate interposed between and held by the side plate and the pressure plate in the axial direction.

19. The power transmission device according to claim 17, further comprising:

a friction member disposed between the first rotor and the second plate in the axial direction, the friction member configured to be rotated unitarily with the second plate, the friction member contacted with the first rotor.

20. The power transmission device according to claim 19, further comprising:

an urging member urging the friction member toward the first rotor.

* * * * *